United States Patent [19]

DeVault et al.

[11] Patent Number: 4,827,728
[45] Date of Patent: May 9, 1989

[54] SEVEN-EFFECT ABSORPTION REFRIGERATION

[75] Inventors: Robert C. DeVault, Knoxville, Tenn.; Wendell J. Biermann, Fayetteville, N.Y.

[73] Assignee: Martin Marietta Energy Systems, Inc., Oak Ridge, Tenn.

[21] Appl. No.: 170,513

[22] Filed: Mar. 21, 1988

Related U.S. Application Data

[63] Continuation-in-part of Ser. No. 933,943, Nov. 24, 1986, Pat. No. 4,732,008.

[51] Int. Cl.$^4$ .............................................. F25B 7/00
[52] U.S. Cl. ...................................... 62/79; 62/238.3; 62/332; 62/335; 62/476
[58] Field of Search .................. 62/79, 332, 335, 476, 62/238.3

[56] References Cited

U.S. PATENT DOCUMENTS

| 3,483,710 | 12/1969 | Bearint | 62/79 |
| 3,531,374 | 6/1985 | Alefeld | 62/79 |
| 3,542,628 | 9/1985 | Sarkisian et al. | 62/335 |
| 4,441,332 | 4/1984 | Wilkinson | 62/335 |

OTHER PUBLICATIONS

P. D. Iedema, "The Absorption Heat Pump with Lithium Bromide/Zinc Bromide/Methanol" WTHD No. 162.
ASHRAE Handbook 1985 Fundamentals 1.20 American Society of Heating, Refrigerating and Air Conditioning Engineers.

Primary Examiner—Lloyd L. King
Attorney, Agent, or Firm—J. Donald Griffin; Bruce M. Winchell

[57] ABSTRACT

A seven-effect absorption refrigeration cycle is disclosed utilizing three absorption circuits. In addition, a heat exchanger is used for heating the generator of the low absorption circuit with heat rejected from the condenser and absorber of the medium absorption circuit. A heat exchanger is also provided for heating the generator of the medium absorption circuit with heat rejected from the condenser and absorber of the high absorption circuit. If desired, another heat exchanger can also be provided for heating the evaporator of the high absorption circuit with rejected heat from either the condenser or absorber of the low absorption circuit.

8 Claims, 1 Drawing Sheet

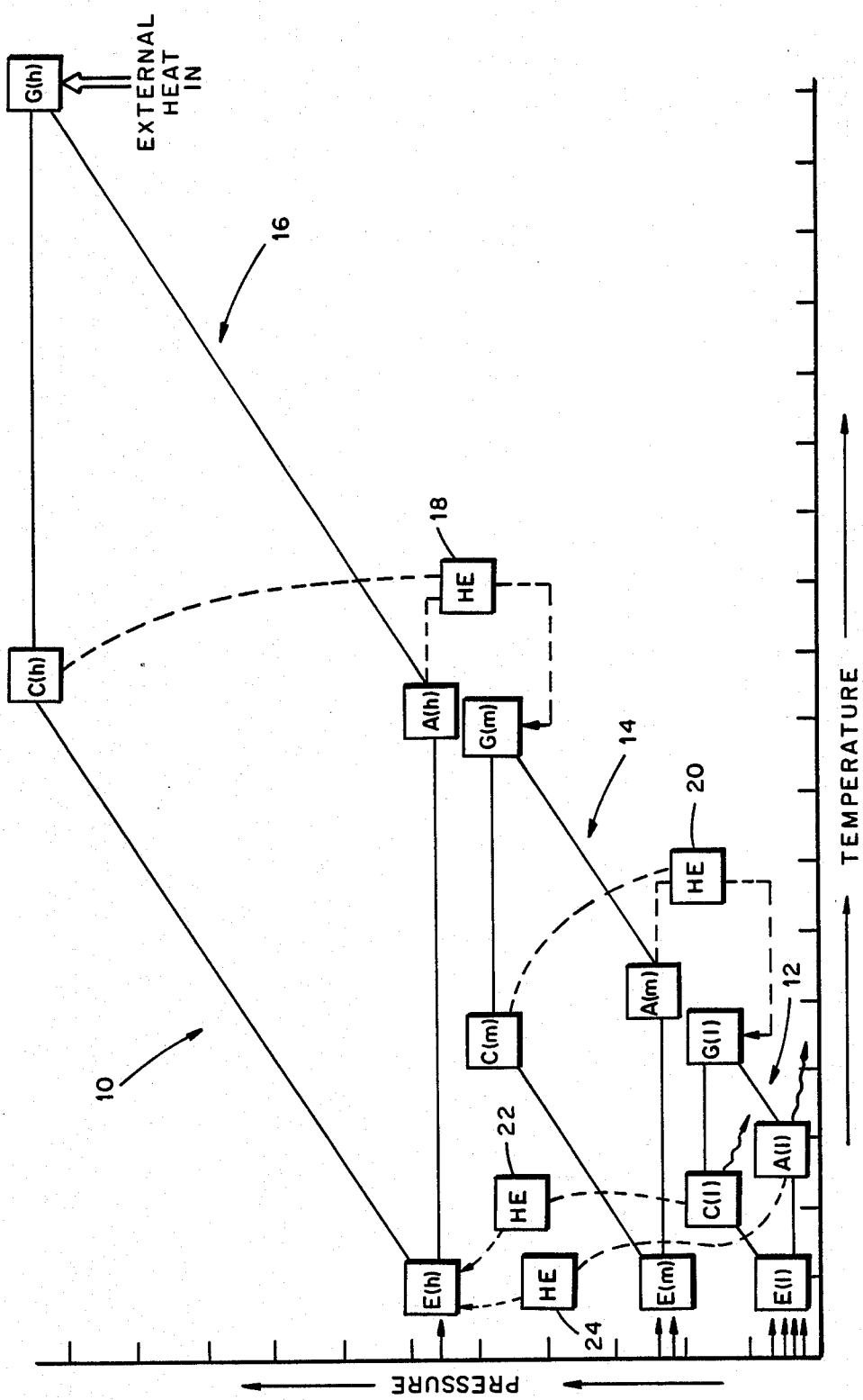

SEVEN-EFFECT ABSORPTION REFRIGERATION

The U.S. Government has rights in this invention pursuant to contract No. DE-AC05-840R21400 awarded by U.S. Department of Energy contract with Martin Marietta Energy Systems, Inc.

CROSS-REFERENCE TO RELATED APPLICATION

This application is a continuation-in-part application of previously filed co-pending application Ser. No. 933,943 filed Nov. 24, 1986, now U.S. Pat. No. 4,732,008.

FIELD OF THE INVENTION

The present invention relates generally to an absorption refrigeration system, and more particularly to a seven-effect absorption refrigeration system utilizing three refrigerant circuits and having an improved thermal performance.

BACKGROUND OF THE INVENTION

Absorption chillers are heat driven refrigeration machines which have been manufactured for several decades. Prior to the mid 1970's "energy crisis" when natural gas was relatively inexpensive, simple absorption machines operating at relatively low efficiency, typically 0.5 to 0.7 coefficient of performance (COP), were economically attractive. Those machines were characterized as quiet, vibration-free, reliable machines whose initial cost per ton of capacity was somewhat higher than equivalent electric equipment. With the increase in natural gas prices since the mid 1970's however, conventional absorption chillers have lost their economic attractiveness.

In absorption refrigeration cycles, a secondary fluid (the absorbent) absorbs a primary fluid (gaseous refrigerant) that has been vaporized in an evaporator. In a typical single-effect absorption refrigeration system, water is used as the refrigerant and lithium bromide as the absorbent. The refrigerant/absorbent combination is known as the solution pair. Other chemical combinations (solutions) have been used, or have the potential for use, in absorption cycles.

The mode of operation for a single-effect absorption chiller is well known in the art. Refrigerant vapor is produced in the evaporator at a temperature somewhat below that of the heat load. The refrigerant vapor is exothermically absorbed by a concentrated absorbent solution entering the absorber. The heat of absorption is then transferred to a heat sink, such as cooling water, at the absorber. The now dilute absorbent solution is pumped to the generator, where it is concentrated again and returned to the absorber. External heat is supplied to the generator to supply the energy required to separate the refrigerant from the absorbent. The refrigerant is condensed at the condenser and is returned to the evaporator while the concentrated absorbent is returned to the absorber. A concentrated absorbent is returned to the absorber. A heat exchanger between the absorber and generator is also part of the system, exchanging heat to the dilute absorbent from the concentrated absorbent solution.

The above process takes place between two pressures: a lower pressure prevailing in the evaporator-absorber section and a higher pressure in the generator-condenser section. The operating temperature limits of the refrigerant/absorbent combination (solution pair), are determined by the chemical and physical properties of the pair.

The cooling thermal efficiency (COP) of a single-effect cycle is typically about 0.5 to 0.7. Modifications of the basic cycle do not bring the coefficient of performance over a threshold of unity, e.g., heat required to generate one pound of refrigerant is not less than the heat taken up when this pound evaporates in the evaporator. Performance can be improved by using the double-effect evaporation principle practiced by the chemical industry for decades and a double-effect generator. With a water lithium bromide pair, two generators can be used. One, at high temperature and pressure, is heated by an external source of thermal energy. A second, at lower pressure and temperature, is heated by condensation of the vapor from the first generator. Condensate from both generators moves to the evaporator. This enables the external thermal energy to be effectively utilized twice in the high and low temperature generators, thereby increasing the overall thermal efficiency as compared to single-effect absorption systems. The thermal efficiency of double-effect cycles is typically about 1.0 to 1.2 with one double-effect absorption machine reported to have attained at 1.3 COP.

Dual loop absorption cycles have been proposed and are being developed in which two separate absorption loops, a high temperature loop and a lower temperature loop, are combined to offer desirable features beyond those attainable with double-effect systems. One previous dual loop system is shown in U.S. Pat. No. 3,483,710 (Bearint) and features a high temperature condenser in heat exchange relation with a low temperature generator. Another system, described in U.S. Pat. No. 4,542,628 (Sarkisian et al), has a high temperature condenser and a high temperature absorber in heat exchange relation with a low temperature generator with simultaneous heat exchange between the high temperature evaporator and the low temperature condenser and/or low temperature absorber.

Additionally, the latter dual loop thermodynamic cycle (but not a machine concept) has been separately proposed by other absorption researchers, viz., P.D. Iedema, *The Absorption Heat Pump with Lithium Bromide/Zinc Bromide/Methanol*, WTHD No. 162, Laboratory of Refrigeration and Indoor Technology, Department of Mechanical Engineering, Delft University of Technology, The Netherlands, April 1984. In these prior dual loop heat pump concepts, the dual loop absorption cycle thermal efficiency is approximately the same as double-effect machines for air conditioning and refrigeration applications, since the external thermal energy is effectively utilized twice to produce the desired cooling effect in the evaporator.

In U.S. Pat. No. 4,531,374 (Alefeld), more than one hundred theoretical multi-stage absorption cycles or multi-stage absorption/compression cycles are disclosed. However, the disclosed cycles extend only to the equivalent of a five-effect absorption cycle system.

While relatively high efficiency double-effect chillers have been developed and manufactured with a COP of 1.0–1.3, even at these higher efficiencies such devices are still only marginally economic in the U.S. Recent innovations have shown improved performance, such as those described in the above-identified Sarkisian et al patent and in U.S. patent application Ser. No. 933,943 filed on Nov. 24, 1986. However, there still is worldwide interest in improving absorption/refrigeration cycles as well as developing new cycles.

SUMMARY OF THE INVENTION

In accordance with the present invention, a multi-effect absorption refrigeration apparatus and method are provided which have an improved thermal performance. A low absorption circuit means is operated at a low temperature range to provide absorption cooling. A medium absorption circuit means and a high absorption circuit means are also operated at a respective medium temperature range and high temperature range. All the circuit means include an associated generator, condenser, evaporator, absorber, and solution pair. The low generator is heated with rejected heat from the medium condenser and the medium absorber. Similarly, the medium generator is heated with rejected heat from the high condenser and high absorber.

In one preferred embodiment of the present invention, the high evaporator is also heated with rejected heat from the low condenser. Alternatively, the high evaporator is heated with rejected heat from the low absorber. In addition, the high solution pair and medium solution pair is water/sodium hydroxide while the low solution pair is water/lithium bromide.

It is an object of the present invention to provide a multi-effect absorption refrigeration with significantly increased thermal performance compared to existing single-effect, double-effect, or dual loop absorption heat pump/refrigeration cycle machines. With the present invention, a thermal performance in the range of 2.19 to 3.12 COP is possible. Such a high efficiency cooling performance results in the ability to cool buildings with less than fifty percent of the primary energy consumption of the best existing air conditioner combinations currently available.

It is also an object of the present invention to provide an improved absorption refrigeration cycle which can utilize multiple refrigerant/absorbent combinations in separate refrigeration circuits.

Other features and objects of the present invention are stated in or are apparent from a detailed description of presently preferred embodiments of the invention found hereinbelow.

BRIEF DESCRIPTION OF THE DRAWING

The single FIGURE is schematic diagram of seven-effect absorption refrigeration cycle using three refrigeration circuits in accordance with the present invention.

DETAILED DESCRIPTION OF THE PREFERRED EMBODIMENTS

Referring now to the drawing in which like numerals represent like elements, a schematic diagram of a seven-effect absorption system 10 is depicted in which the thermodynamic relationship between the various components is illustrated where temperature increases from left to right along the abscissa and pressure increases along the ordinate. Absorption system 10 has three absorption refrigeration circuits, a low absorption circuit 12, a medium absorption circuit 14, and a high absorption circuit 16. Each absorption circuit 12, 14, and 16 has its own separate solution pair. Each absorption circuit 12, 14, and 16 is designed to operate in the same fashion as a conventional single-effect absorption cycle as known to those of ordinary skill in the art. Thus, each absorption circuit 12, 14, and 16 has an associated condenser C, generator G, absorber A, and evaporator E. However, it should be appreciated that condenser C(h) and absorber A(h) of high absorption circuit 16 and condenser C(m) and absorber A(m) of medium absorption circuit 14 are operated at much higher temperatures than in a conventional single-effect cycle. With this configuration, low absorption circuit 12 is then thermodynamically a conventional single-effect absorption cycle.

Each absorption circuit 14 and 16 is in heat exchange relationship with respective absorption circuits 12 and 14. Thus, as shown in the drawing, a heat exchange means 18 is provided for transferring reject heat from high absorption circuit 16 via condenser C(h) and absorber A(h) to generator G(m) of medium absorption circuit 14. Similarly, a heat exchange means 20 is provided for transferring reject heat from condenser C(m) and absorber A(m) of medium absorption circuit 14 to generator G(l) of low absorption circuit 12.

By operating high absorption circuit 16 such that both condenser C(h) and absorber A(h) are at a higher temperature than generator G(m) of medium absorption circuit 14, all of the heat rejected by both condenser C(h) and absorber A(h) is effectively utilized to heat generator G(m). This means that medium absorption circuit 14 produces about twice as much refrigerant vapor as in generated in high absorption circuit 16 with the input of external thermal energy via generator G(h).

Medium absorption circuit 14 is also operated so that both condenser C(m) and absorber A(m) are at a higher temperature than generator G(l) of low absorption circuit 12. All of the heat rejected by both condenser C(m) and absorber A(m) is effectively utilized to heat generator G(l). Therefore, about twice as much refrigerant vapor is produced in low absorption circuit 12 as was generated in medium absorption circuit 14. Since the refrigerant vapor in medium absorption circuit 14 is twice as much as was generated in high absorption circuit 16 with the input of external thermal energy, the resulting refrigerant vapor in lower absorption circuit 12 is therefore four times the refrigerant vapor generated in high absorption circuit 16.

By effectively utilizing evaporators E(h), E(m), and E(l), absorption system 10 produces one unit of refrigeration effect in high absorption circuit 16, two units of refrigeration effect in medium absorption circuit 14 and four units of refrigeration effect in low absorption circuit 12. Thus, a total of seven units of refrigeration effect are achieved for one unit of external thermal energy, and hence the designation "seven-effect" cycle or system.

Cooling COP's above 3.0 have been calculated using $NaOH/H_2O$ in high absorption circuit 16 and medium absorption circuit 14 and $LiBr/H_2O$ in low absorption circuit 12. The performance of seven-effect absorption system 10 has also been calculated for several sets of conditions and compared to the performance of other absorption chillers which are commercially available. The conditions imposed and the relative performance of each unit are shown in the following table.

| Cycle Type | COP | Normalized Area (sw. meters) | | | | | | App. Fab. Cost/ 1000 kW | Cost/ COP |
|---|---|---|---|---|---|---|---|---|---|
| | | Evap | Abs | Cond | GE | HX | Total | | |
| Carrier 16JB024 Commercial Single-Effect | 0.70 | 60.0 | 53.8 | 29.4 | 32.9 | 18.1 | 194 | 29,100 | 41,571 |
| Double-Effect Commercial Surface | 1.21 | 60.0 | 58.1 | 17.5 | 104.2 | 37.4 | 277.2 | 41,583 | 34,366 |
| 3-Effect 10/3/86 Best Cost/ Efficiency | 1.82 | 60.0 | 55.9 | 20.5 | 107.0 | 16.0 | 259.4 | 38,915 | 21,382 |
| 7-Effect 10/2/86 Commercial Surface | 2.19 | 60.0 | 76.5 | 18.1 | 137.0 | 52.9 | 344.6 | 51,684 | 23,600 |
| 3-Effect 9/26/86* Extended Surface | 1.79 | 124.0 | 134.0 | 55.8 | 132.3 | 27.3 | 473.3 | 70,988 | 39,658 |
| 7-Effect 9/28/86 Extended Surface | 2.77 | 124.0 | 151.0 | 48.7 | 143.0 | 46.4 | 513.2 | 76,987 | 27,793 |
| 7-Effect 10/3/86 Best Config. #2 | 3.12 | 124.0 | 136.7 | 48.8 | 129.2 | 26.2 | 464.8 | 69,718 | 22,346 |

*Different absorption fluids than used in "best cost/efficiency" 3-Effect cycle.

There are numerous potential variations possible based on a seven-effect absorption cycle utilizing three refrigeration circuits. Each possible variation relates to use of the cycle in various configurations to also provide heating operation in the winter time. However, because of current fluid limitations (for example, the use of NaOH/H2O in the high and medium temperature refrigeration circuits) only a small number of possible variations can currently be fabricated and operated.

One variation would be a seven-effect absorption chiller with above freezing evaporator (about 7° C. ambient) heat pumping and below freezing evaporator direct fired heater for heating. Refrigerant in each of the three refrigerant circuits would be water, so below freezing evaporator temperatures would not be allowed.

Another variation would be the use of a non-freezing refrigerant in the lower temperature absorption refrigeration circuit. For example, ammonia/water could be used, allowing the lower circuit to operate as a below-freezing single-effect heat pump.

As new fluids become available for absorption systems in the future, additional variations with the potential for two-effect, three-effect, four-effect, five-effect, six-effect and seven-effect heating operation may become feasible. Possible new fluids include ammonia/lithium nitrate mixtures, or water/sodium hydroxide and potassium hydroxide mixtures.

It should be appreciated that seven-effect absorption system 10 makes use of three different absorption circuits which are thermally coupled together to effectively utilize heat input seven times to obtain substantially higher efficiency than is possible with previous absorption cycles. By having three single-effect absorption circuits 12, 14, and 16 whose fluids are separate, different absorption solution pairs are independently selected for each single-effect circuit to maximize efficiency of absorption system 10. In fact, it should also be appreciated that operation as a seven-effect cycle is not possible with any single absorption solution pair in all of the three single-effect circuits. Thus, careful selection of the different solution pairs for each of the three absorption circuits is necessary before operation as a seven-effect system can be achieved.

It is also possible to operate absorption system 10 with reject heat from either condenser C(l) or absorber A(l) of low absorption circuit 12 supplying reject heat to evaporator E(h) of high absorption circuit 16. This is done by suitable heat exchange means 22 and 24, respectively. With this configuration, a six-effect absorption cycle is realized using three refrigeration circuits. An advantage of such a six-effect version is a lower generator G(h) temperature for high absorption circuit 16 and thus a greater possibility of finding acceptable solution pairs for use in high absorption circuit 16.

Another possible application for absorption circuit 10 using three refrigeration circuits is in desalination It has previously been proposed by Hydro-Dyne Company of Massilon, Ohio to use a high-efficiency absorption chiller cycles to improve the efficiency of water desalination equipment. As absorption system 10 is such a high-efficiency apparatus, desalination is thus another possible application.

While the present invention has been described with respect to exemplary embodiments thereof, it will be understood by those of ordinary skill in the art that variations and modifications can be effected within the scope and spirit of the invention.

We claim:

1. A multi-effect absorption refrigeration apparatus comprising:
   a low absorption circuit means for absorption cooling at a low temperature range, said low circuit means including a low generator, a low condenser, a low evaporator, a low absorber, and a low solution pair;

a medium absorption circuit means for absorption cooling at a medium temperature range, said medium circuit means including a medium generator, a medium condenser, a medium evaporator, a medium absorber, and a medium solution pair, said medium temperature range being such that operation temperatures of both said medium condenser and said medium absorber are higher than an operating temperature of said low generator;

a high absorption circuit means for absorption cooling at a high temperature range, said high circuit means including a high generator, a high condenser, a high evaporator, a high absorber, and a high solution pair, said high temperature range being such that operation temperatures of both said high condenser and said high absorber are higher than an operating temperature of said medium generator;

a first heat exchanger means for heating said low generator with rejected heat from said medium condenser and said medium absorber; and a second heat exchanger means for heating said medium generator with rejected heat from said high condenser and said high absorber.

2. An apparatus as claimed in claim 1 and further including a third heat exchanger means for heating said high evaporator with rejected heat from said low condenser.

3. An apparatus as claimed in claim 1 and further including a third heat exchanger means for heating said high evaporator with rejected heat from said low absorber.

4. An apparatus as claimed in claim 1 wherein said high solution pair is water/sodium hydroxide, said medium solution pair is water/sodium hydroxide, and said low solution pair is water/lithium bromide.

5. A method for multi-effect absorption refrigeration comprising the steps of:

operating a low absorption circuit at a low temperature range, the low absorption circuit including a low generator, a low condenser, a low evaporator, a low absorber, and a low solution pair;

operating a medium absorption circuit at a medium temperature range, the medium absorption circuit including a medium generator, a medium condenser, a medium evaporator, a medium absorber, and a medium solution pair, the medium absorption circuit operating step being such that operation temperatures of the medium condenser and the medium absorber are higher than an operating temperature of the low generator;

Operating a high absorption circuit at a high temperature range, the high absorption circuit including a high generator, a high condenser, a high evaporator, a high absorber, and a high solution pair, the high absorption circuit operating step being such that operation temperatures of the high condenser and the high absorber are higher than an operating temperature of the medium generator;

heating the low generator with rejected heat from the medium condenser and the medium absorber; and heating the medium generator with rejected heat from the high condenser and the high absorber.

6. A method as claimed in claim 5 and further including the step of heating the high evaporator with rejected heat from the low condenser.

7. A method as claimed in claim 5 and further including the step of heating the high evaporator with rejected heat from the low absorber.

8. A method as claimed in claim 5 wherein the high solution pair is water/sodium hydroxide, the medium solution pair is water/sodium hydroxide, and the low solution pair is water/lithium bromide.

* * * * *